United States Patent [19]
Mori et al.

[11] Patent Number: 5,136,387
[45] Date of Patent: Aug. 4, 1992

[54] RF MODULAR REQUIRING NO TEST PATTERN GENERATOR

[75] Inventors: Hiroyoshi Mori, Yokohama; Shigetaka Sawa, Kawasaki, both of Japan

[73] Assignee: Kabushiki Kaisha Toshiba, Japan

[21] Appl. No.: 688,313

[22] Filed: Apr. 22, 1991

[30] Foreign Application Priority Data

Apr. 23, 1990 [JP] Japan ................. 2-107151

[51] Int. Cl.$^5$ .................... H04N 5/50; H04N 9/65; H04N 5/38; H04N 5/40
[52] U.S. Cl. ................... 358/191.1; 358/186; 358/23; 455/102
[58] Field of Search ............ 358/191.1, 192.1, 193.1, 358/194.1, 188, 196, 197, 198, 189, 23, 186, 343, 335; 455/102, 108; 360/19.1

[56] References Cited

U.S. PATENT DOCUMENTS

| | | | |
|---|---|---|---|
| 3,778,718 | 12/1973 | Bass ................. | 455/102 |
| 4,263,617 | 4/1981 | Chemin ............. | 358/186 |
| 4,491,871 | 1/1985 | Schmitz ............. | 358/186 |
| 4,500,920 | 2/1985 | Ohyama ............ | 358/186 |
| 4,788,590 | 11/1988 | Arai ................... | 358/23 |

Primary Examiner—Howard W. Britton
Assistant Examiner—Sherrie Hsia
Attorney, Agent, or Firm—Banner, Birch, McKie & Beckett

[57] ABSTRACT

An RF modulator according to this invention is constructed so as to allow channel setting without a test pattern generator. Specifically, the RF comprises an A/D converter for digitizing the TV channel setting data, an oscillator control circuit for controlling both the audio carrier oscillation and the RF carrier oscillation on the basis of the channel setting data digitized by the A/D converter, a signal adder for combining the video signal amplitude-modulated at the frequency of the RF carrier oscillation with the audio signal frequency/amplitude-modulated at the frequency of the audio carrier oscillation, channel picking-up means for picking up a portion near the center of each channel in the channel setting data, and a clipper circuit for cutting of the video signal at both ends of each channel setting range that have not been picked up by the channel picking-up means.

9 Claims, 4 Drawing Sheets

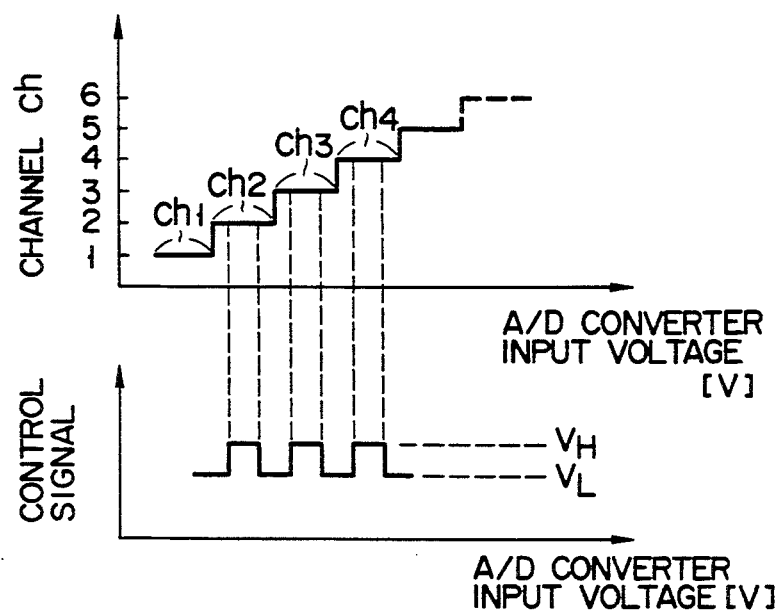
F I G. 2A
F I G. 2B
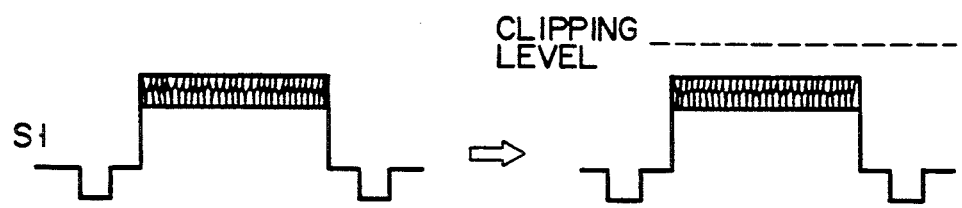
F I G. 3A
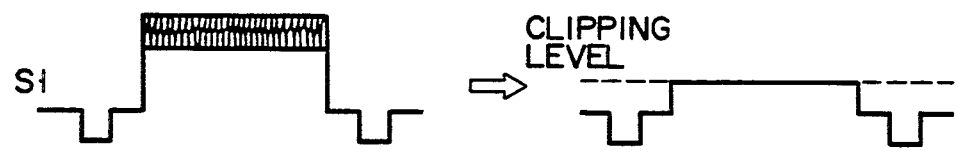
F I G. 3B

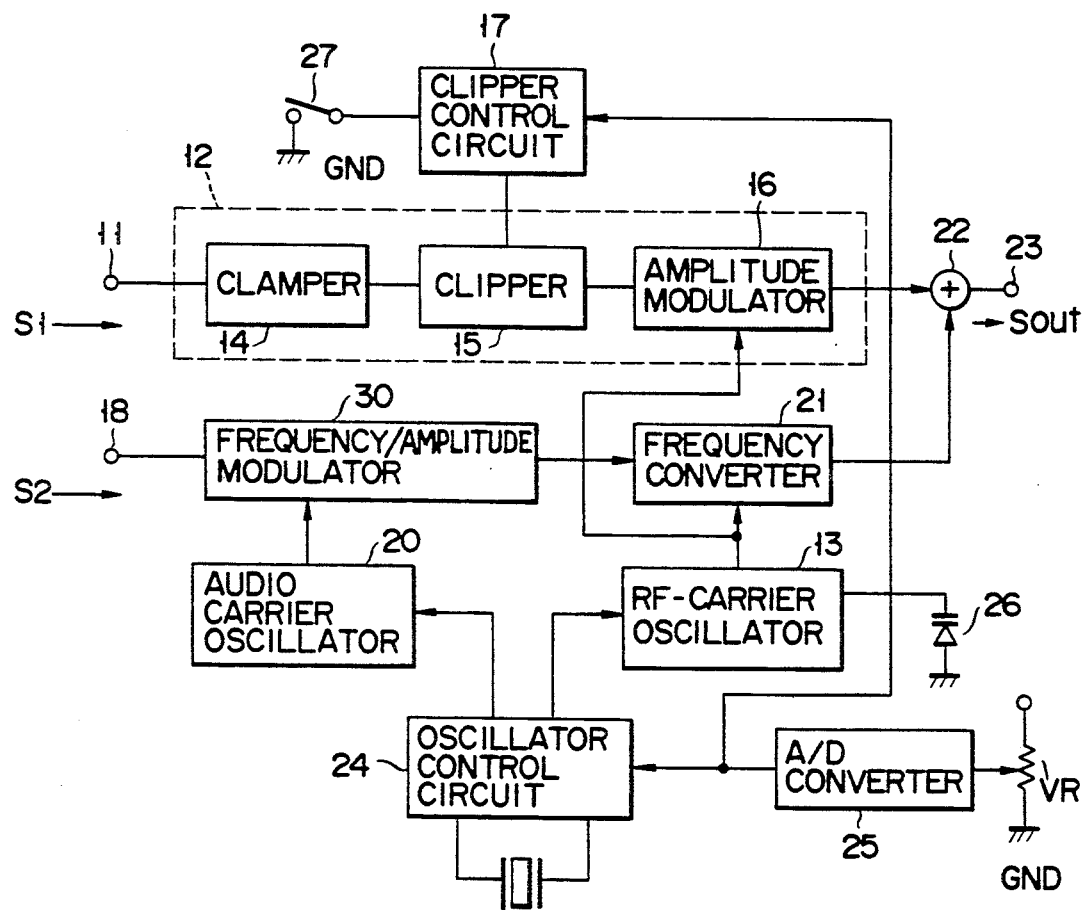
F I G. 5

RF MODULAR REQUIRING NO TEST PATTERN GENERATOR

BACKGROUND OF THE INVENTION

1. Field of the Invention

This invention relates to an RF modulator, and more particularly, to an RF modulator built in a VCR (video cassette recorder) that performs TV channel setting through the frequency synthesizer technique.

2. Description of the Related Art

In addition to its main signal processing system, a VCR (video cassette recorder) generally incorporates an RF modulator that RF (radio frequency)-converts the signal from the signal processing system in order to produce a signal suitable for output to the TV (television).

In replaying videotape, the video signal is amplitude-modulated by the amplitude modulator at the frequency generated by an RF carrier oscillator. The audio signal is frequency-modulated by the frequency modulator at the frequency generated by an audio carrier oscillator. The frequency-modulated audio signal is further converted, by a frequency converter, into a frequency generated by the RF carrier oscillator.

The amplitude-modulated video signal and the once-frequency-converted audio signal are added to form an RF signal output, which is in turn transmitted to the TV system.

Channel setting for a playback of videotape is performed by changing the oscillating frequency of the RF carrier oscillator by use of a variable capacitor. The purpose of channel setting is to put the video and audio signals on a vacant TV channel. Each country requires its unique channel setting in the UHF band. To deal with this situation, the variable capacitor is used to cover a wide channel setting range.

To perform channel setting, the user operates the channel setting mode switch. This activates a test pattern generator, whose output signal is connected to the video signal system, with the result that the generator-created test pattern is converted into an RF signal that is supplied to the TV system.

At this point, the TV is set or been set to tune a vacant channel. The variable capacitor is then adjusted so that the test pattern appears on the vacant channel. After the channel setting is complete, the test pattern generator is disconnected to return to the normal mode.

In an RF generator with such an arrangement, the variable capacitor is used to change the oscillating frequency of the RF carrier oscillator for TV channel setting. This raises a problem: use of the variable capacitor results in susceptibility to temperature drift and changes with passage of time in terms of mechanical accuracy, making it impossible to provide stable reception irrespective of the proper channel setting.

Recent VCRs produce signals usable in place of the test pattern for channel setting, such as a signal that makes the entire screen blue or what is called a blue back. This makes it unnecessary to operate the test pattern generator to supply the test pattern.

SUMMARY OF THE INVENTION

Accordingly, the object of the present invention is to provide an RF modulator without a test pattern generator which enables stable TV reception by channel setting.

The object of the present invention is achieved by an RF modulator, comprising: an A/D converter for digitizing data corresponding to the channel to be set; an oscillator control circuit for controlling both audio carrier oscillation and RF carrier oscillation on the basis of the channel setting data digitized by the A/D converter; signal synthesizing means for combining the video signal amplitude-modulated at the frequency of the RF carrier oscillation with the audio signal frequency/amplitude-modulated at the frequency of the voice-carrier oscillation; channel picking-up means for picking up a portion near the center of each channel in the channel setting data; and signal cut-off means for cutting off the video input signal at both ends of each channel setting range which have not been picked up by the picking-up means.

With this configuration, the channel picking-up means picks up a portion near the center of each channel in the A/D converter-digitized channel setting data, while the clipper circuit substantially cuts off the video signal at a suitable clipping level at both ends of each channel setting range that have not been picked up. This makes the channel setting immune to temperature drift and change with passage of time in terms of mechanical accuracy.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a characteristic diagram of the channel 1 setting data with respect to the A/D converter input voltage received by the clipper control circuit of FIG. 1;

FIG. 2B shows a signal waveform of the control signal with respect to the A/D converter input voltage received by the clipper control circuit of FIG. 1;

FIGS. 3A and 3B show waveforms each used to explain the operation of the clipper control circuit of FIG. 1;

FIG. 5 is a block diagram for an application according to the embodiment of FIG. 1.

DETAILED DESCRIPTION OF THE PREFERRED EMBODIMENTS

Referring to the accompanying drawings, the present invention will be explained using embodiments.

Figure 1:
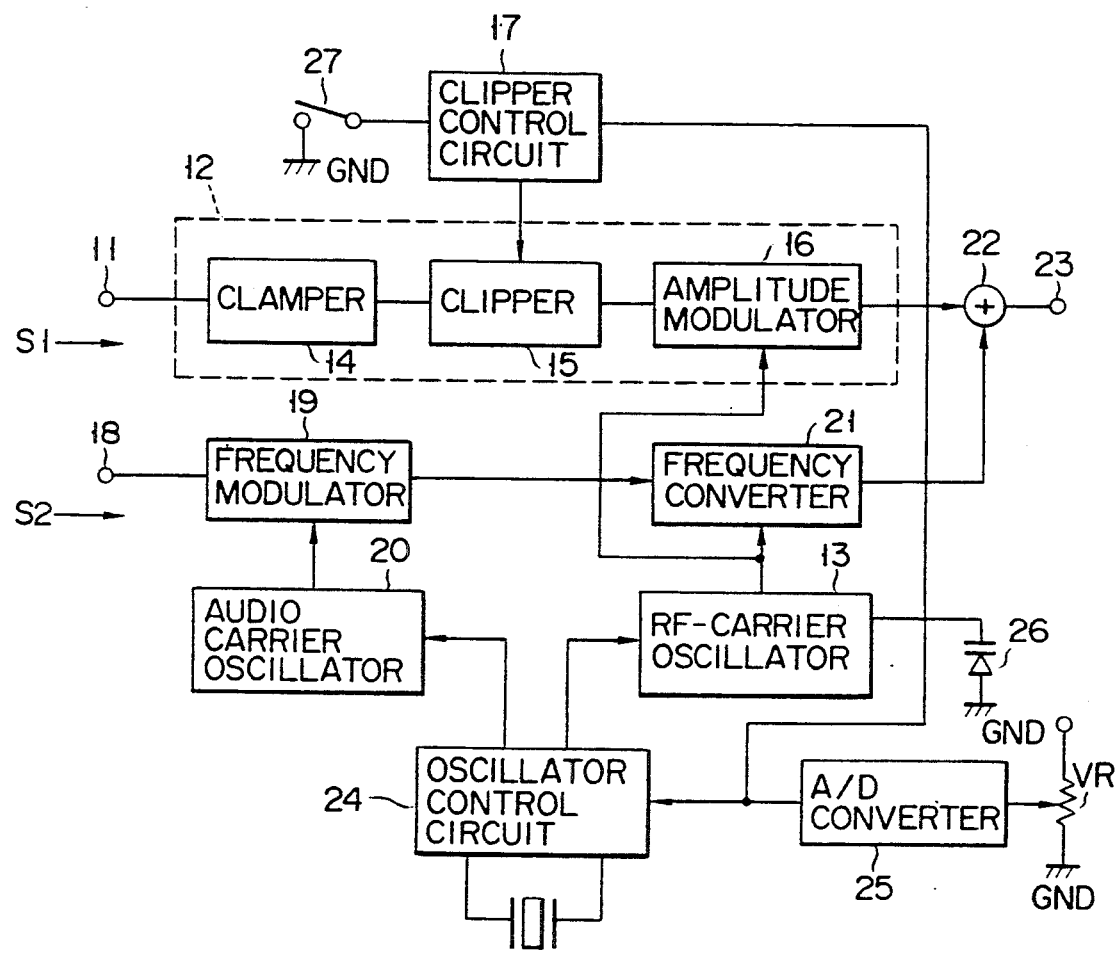
FIG. 1 is a block diagram showing the composition of an embodiment according to the present invention.

FIG. 1 is a block diagram showing the structure of an RF modulator according to a first embodiment of the present invention.

In this invention, a varactor diode-based voltage-controlled oscillator is used in place of a variable capacitor to change the oscillating frequency of the RF carrier oscillator. As explained above, a variable capacitor is difficult to use for stable TV reception. The oscillator is connected into the PLL (phase-locked loop) to compose a frequency synthesizer-type RF modulator that digitally controls the control voltage of the varactor diode.

In replaying videotape, the video signal S1 supplied to terminal 11 is amplitude-modulated, by a modulator unit 12, at the frequency generated at an RF carrier oscillator 13. The modulator unit 12 is composed of a clamper circuit 14, a clipper circuit 15, and an amplitude modulator 16. The clipper circuit 15 is controlled by a clipper control circuit 17. The audio signal S2 supplied to terminal 18 is frequency-modulated, by a frequency modulator 19, at the frequency produced at the audio carrier oscillator 20. This frequency-modulated audio signal S2 is then converted into the frequency generated by the RF carrier oscillator 13 by frequency converter 21. The amplitude-modulated video signal S1 and the once-frequency-modulated frequency-converted audio signal S2 are added together at an adder 22 and the result appears as the RF signal $S_{out}$ at terminal 23.

Both the RF carrier oscillator 13 and the audio carrier oscillator 20 are controlled by an oscillator control circuit 24. The analog input signal from a variable resistor VR, which serves as an external adjusting element, is converted into a digital signal at an A/D converter 25. This digital signal is supplied to both the oscillator control circuit 24 and clipper control circuit 17.

The oscillator control circuit 24 determines the required frequency dividing ratio from the channel setting data and changes its pulse width on the basis of the digital signal from A/D converter 25. RF carrier oscillator 13 compares its own frequency with that of the oscillator control circuit 24 at a tuning varactor diode 26, which constitutes a PLL. In this way, the oscillating frequency of audio carrier oscillator 20 and RF carrier oscillator 13 is set digitally.

In clipper control circuit 17, which receives a digital signal from A/D converter 25, previously prepared channel data is compared with A/D-converted channel setting data to pick up the center of the voltage range at which each channel is set. The process for channel setting will be explained hereinafter.

As shown in FIG. 2A, the A/D converter 25 supplies individual channel setting data, in the form of an input voltage of a specific width from the external adjusting element VR, to the clipper control circuit 17. Then, the clipper control circuit 17 outputs a control signal that functions in such a way that the channel setting may not be made at either end of each channel voltage range set by the A/D converter, these ends adjoining the preceding and succeeding ranges. That is, as shown in FIG. 2B, with the clipper control circuit 17, when the setting voltage is present near the center of the channel setting range, the signal $V_H$ is supplied, but otherwise, the signal $V_L$ is supplied.

Receiving the signals $V_H$ and $V_L$ from the clipper control circuit 17, the clipper circuit 15 changes the clipping level as shown in FIGS. 3A and 3B. For the input of signal $V_H$, the circuit 15 performs the normal white clipping of video signal S1 to prevent over-modulation, whereas for the input of signal $V_L$, it substantially cuts off the video signal S1 with the clipping level at a low value.

In such an operation, only the video signal near the center of the channel setting voltage range is output. Adjusting the variable resistor VR so that the video signal thus obtained may appear on the screen causes the voltage to be set near the center of each channel.

The way for the user to set the output frequency for each channel using the above-mentioned arrangement will be explained hereinafter. It is assumed that the VCR signal system supplies a video signal distinguishable from other stations's broadcasts, such as a blue back.

First, the TV reception channel is set for a vacant channel not occupied by a TV station. The channel setting mode switch 27 (shown in FIG. 1) of the RF modulator is then turned on. After this, the variable resistor VR is adjusted so that the video signal from the VCR signal system such as a blue back may appear on the screen. The RF modulator's channel setting switch 27 is then turned off.

With this configuration, even if there are fluctuations in the supply voltage, a temperature drift, and the change with passage of time, the adjusting voltage is prevented from straying from near the center of the channel setting voltage range. This allows the construction of an frequency synthesizer-type RF modulator that needs no test pattern generator and provides stable TV reception.

Figure 4:
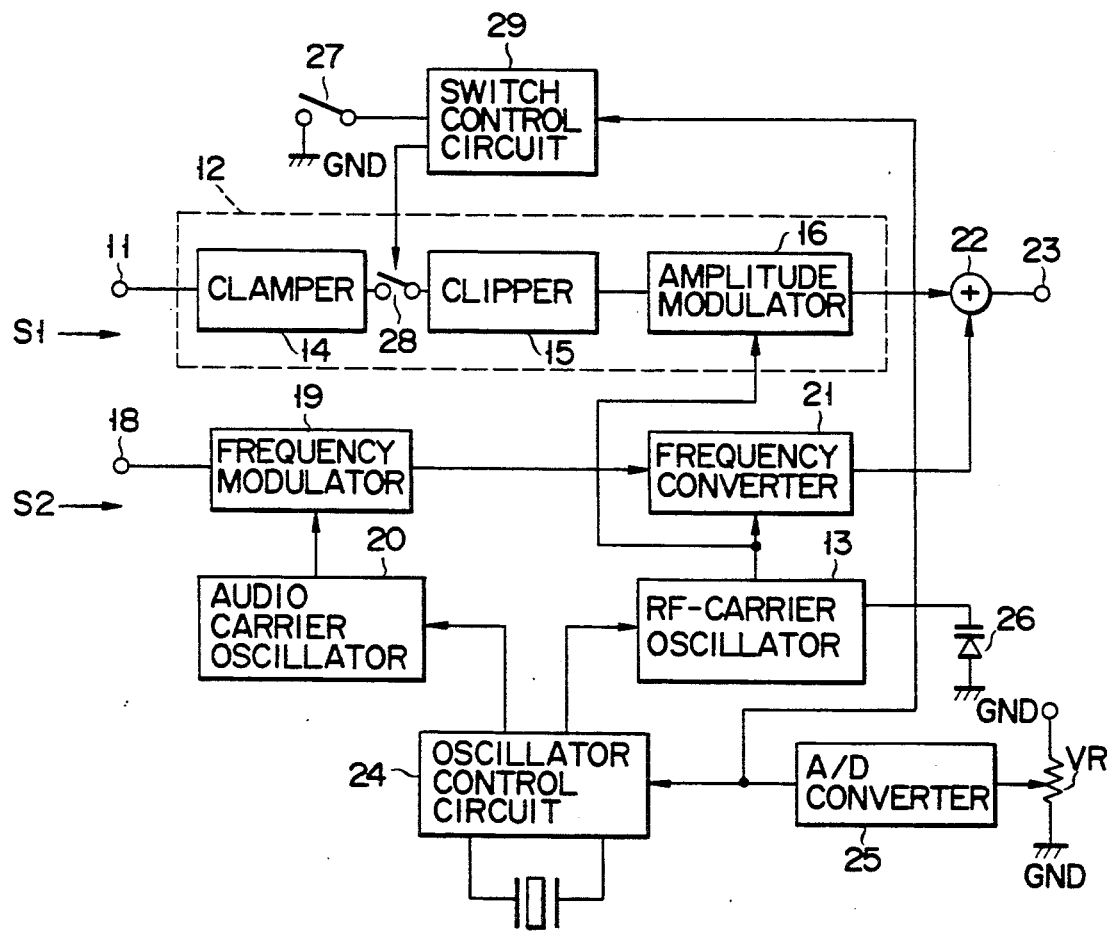
FIG. 4 is a block diagram illustrating the arrangement of a second embodiment in accordance with the present invention.

FIG. 4 is a block diagram showing the structure of an RF modulator according to a second embodiment of the present invention. The arrangement of FIG. 4 is the same as that of FIG. 1 except that a switch 28 is connected between the clamper circuit 14 and the clipper circuit 15 and a switch control circuit 29 is provided in place of the clipper control circuit 17 to control switch 28.

As with the control signal of FIG. 2B, the switch control circuit 29 produces the signal $V_H$ when the setting voltage is near the center of the channel setting range, but otherwise it generates the signal $V_L$. The channel setting range for each channel is supplied in the form of the input voltage from the A/D converter 25. The switch control circuit 29 turns the switch 28 on during the existence of signal $V_H$, causing the clipper circuit 15 to carry out the normal white clipping of video signal S1 to prevent overmodulation. During the period of signal $V_L$, it turns the switch 28 off to cut off the video signal S1.

Although both embodiments described above are designed so that the audio signal S2 may be frequency-modulated by the frequency modulator 19, a frequency/ amplitude modulator 30 capable of both frequency and amplitude modulations may be used instead of the frequency modulator 19. In this connection, FIG. 5 show an application of the frequency/amplitude modulator 30 to the FIG. 1's arrangement. The same holds true for the arrangement shown in FIG. 4.

Accordingly, in the VCR using a signal usable as the test pattern signal, such as a blue back, use of the arrangements according to the above-described embodiments makes it possible to provide an RF modulator that functions as a frequency synthesizer without a test pattern generator and assures stable TV reception in channel setting.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An RF modulator that performs TV channel setting, comprising:
    an A/D converter for digitizing data corresponding to a selected frequency within a channel range;
    an audio carrier oscillator;

a frequency modulator for receiving an audio signal, and frequency modulating said audio signal in accordance with the frequency of said audio carrier oscillator;

an RF carrier oscillator;

an amplitude modulator for receiving a video signal, and amplitude modulating said video signal in accordance with the frequency of said RF carrier oscillator;

an oscillator control circuit for controlling the audio carrier oscillator and the RF carrier oscillator in accordance with the data digitized by said A/D converter;

signal synthesizing means for combining the amplitude-modulated video signal with the frequency-modulated audio signal;

signal control means for receiving said video signal and 1) passing said video signal if the digitized data from said A/D converter corresponds to a frequency region near the center of a channel range and 2) preventing said video signal from passing if the digitized data from said A/D converter does not correspond to a frequency region near the center of a channel range.

2. An RF modulator according to claim 1, wherein said signal control means compares said digitized data from said A/D converter with previously prepared data and produces a signal capable of indicating whether the digitized data corresponds to a frequency region near the center of a channel range.

3. An RF modulator according to claim 1, wherein said signal control means includes a clipper circuit for clipping said video signal at a suitable clipping level.

4. An RF modulator according to claim 1, wherein said signal control means includes a switch circuit for cutting off the transmitting path of said video signal.

5. An RF modulator according to claim 1, further comprising means for amplitude modulating said audio signal.

6. An RF modulator that performs TV channel setting, comprising:

an A/D converter for digitizing data corresponding to a selected frequency within a channel range;

an audio carrier oscillator;

a frequency modulator for receiving an audio signal, and frequency modulating said audio signal in accordance with the frequency of said audio carrier oscillator;

an RF carrier oscillator;

an amplitude modulator for receiving a video signal, and amplitude modulating said video signal in accordance with the frequency of said RF carrier oscillator;

an oscillator control circuit for controlling the audio carrier oscillator and the RF carrier oscillator in accordance with the data digitized by said A/D converter;

signal synthesizing means for combining the amplitude-modulated video signal with the frequency-modulated audio signal;

clipping means for clipping said video signal at a suitable clipping level if the digitized data from said A/D converter corresponds to a frequency region near the ends of a channel range.

7. An RF modulator that performs TV channel setting, comprising:

an A/D converter for digitizing data corresponding to a selected frequency within a channel range;

an audio carrier oscillator;

a frequency modulator for receiving an audio signal, and frequency modulating said audio signal in accordance with the frequency of said audio carrier oscillator;

an RF carrier oscillator;

an amplitude modulator for receiving a video signal, and amplitude modulating said video signal in accordance with the frequency of said RF carrier oscillator;

an oscillator control circuit for controlling the audio carrier oscillator and the RF carrier oscillator in accordance with the data digitized by said A/D converter;

signal synthesizing means for combining the amplitude-modulated video signal with the frequency-modulated audio signal;

switch means for cutting off a transmission path of said video signal if the digitized data from said A/D converter corresponds to a frequency region near the ends of a channel range.

8. An RF modulator that performs TV channel setting, comprising:

an A/D converter for digitizing data corresponding to a selected frequency within a channel range;

an RF carrier oscillator;

an amplitude modulator for receiving a video signal, and amplitude modulating said video signal in accordance with the frequency of said RF carrier oscillator;

an oscillator control circuit for controlling the RF carrier oscillator in accordance with data digitized by said A/D converter;

B signal control means for receiving said video signal and 1) passing said video signal if the digitized data from said A/D converter corresponds to a frequency region near the center of a channel range and 2) preventing said video signal from passing if the digitized data from said A/D converter does not correspond to a frequency region near the center of a channel range.

9. An RF modulator according to claim 8, wherein said signal control means includes switch means for cutting off a transmission path of said video signal if the digitized data from said A/D converter corresponds to a frequency region near the ends of a channel range.

* * * * *